United States Patent [19]
Glasser et al.

[11] Patent Number: 5,864,025
[45] Date of Patent: Jan. 26, 1999

[54] METHOD OF MAKING MAGNETIC, CROSSLINKED CHITOSAN SUPPORT MATERIALS AND PRODUCTS THEREOF

[75] Inventors: Wolfgang G. Glasser; Rajesh K. Jain, both of Blacksburg, Va.

[73] Assignee: Virginia Tech Intellectual Properties, Inc., Blacksburg, Va.

[21] Appl. No.: 885,842

[22] Filed: Jun. 30, 1997

[51] Int. Cl.$^6$ .............................. C08L 5/08; C08B 37/08; C04B 35/26; H01F 1/00
[52] U.S. Cl. ................. 536/20; 106/162.2; 252/62.51 R; 252/62.53; 252/62.56
[58] Field of Search ................. 106/162.2; 252/62.51 R, 252/62.53, 62.56; 536/20

[56] References Cited

U.S. PATENT DOCUMENTS

| | | | |
|---|---|---|---|
| 4,285,819 | 8/1981 | Yen et al. | 252/62.51 R |
| 4,879,340 | 11/1989 | Moriguchi et al. | 525/54.2 |
| 5,530,111 | 6/1996 | Glasser et al. | 536/56 |

OTHER PUBLICATIONS

Marchessault, et al., Polymer, 33, 4024–4027, 1992 (no month).
Nixon, et al., Chem. Mater., 4, 117–121, 1992 (no month).
Setchell, J. Chem. Tech. Biotechnol., 35B, 175–182, 1985 (no month).
Melville, et al., Nature, 255, 706, Jun. 1975.
Information Brochure of Paesel–Lorei Co., Frankfurt am Main Germany, entitled "Magnetic Separation with Micro–Particles", 4 pages total, undated.

*Primary Examiner*—Peter A. Szekely
*Attorney, Agent, or Firm*—Whitham, Curtis & Whitham

[57] ABSTRACT

Method for magnetizing crosslinked chitosan support material involving the treatment of carboxyl group-containing, crosslinked chitosan gels with solutions of ferrous chloride followed by treatment with dilute aqueous alkali and then oxidation with molecular oxygen gas to produce highly-enriched magnetized chitosan particles, beads, films and/or coatings.

17 Claims, 3 Drawing Sheets

STEP A

STEP B

STEP C

METHOD OF MAKING MAGNETIC, CROSSLINKED CHITOSAN SUPPORT MATERIALS AND PRODUCTS THEREOF

BACKGROUND OF THE INVENTION

1. Field of the Invention

The invention is generally related to a method for forming magnetic, crosslinked chitosan support materials, and magnetic, crosslinked chitosan products obtained by this method.

2. Description of the Prior Art

The application of magnetic separation technologies to biotechnology has been proposed and practiced. E.g., see D. Melville et al., "Direct magnetic separation of red cells from whole blood", Nature, Vol. 255, Jun. 26, 1975, p. 706; C. Setchell, "Magnetic Separations in Biotechnology-A Review", J. Chem. Tech. Biotechnol., 1985, 35B, 175–182; and undated trade brochure by Paesel-Lorei GMBH & Co., "Magnetic Separation with Micro-Particles", Flinschstr. 67, W-6000 Frankfurt am Main 60.

As described in L. Nixon et al., "Preparation and Characterization of Novel Magnetite-Coated Ion-Exchange Particles", Chem. Mater., Vol. 4, No. 1, 1992, 4, 117–121. magnetizable particles for bioseparations have been made by incorporating magnetite into ion-exchange gel particles in two different modes. In one mode, the magnetite was deposited as a thin permeable layer on the surface of the ion-exchange beads, which were cross-linked agarose functionalized with carboxymethyl exchange groups or sulfopropyl groups (i.e., S-Sepharose), to form a coated type of magnetic particle. In a second mode, the magnetite was dispersed into agarose gel prior to bead formation.

R. H. Marchessault et al., Polymer, 33, 4024–4027 (1992), disclose a technique for preparing magnetic cellulose fibers and paper obtained by synthesizing ferrites in situ. In situ synthesis of iron oxide particles was performed by Marchessault et al. via careful oxidation of ferrous hydroxide precipitated with caustic from the ferrous ion-exchanged form of the matrix. The chemistry yielded magnetic fibers containing small ferrite ($Fe_3O_4$) particles of about 10 nm in size. Marchessault et al. exemplify carboxymethylated cellulose fibers as the material subjected to the magnetization scheme disclosed therein, but also suggest that the process could be practiced with a wide range of natural biopolymers such as polysaccharides and lignocellulosics with amino, carboxyl and sulfonic acid groups, such as chitosan, although no reference nor distinction is made as between uncrosslinked and crosslinked forms thereof.

Chitosan is a generally known support material for separation processes. Chitosan is the acid-soluble deacetylation product of chitin. For example, chitosan is the product of alkaline hydrolysis of abundant chitin produced in the crab shelling industry. Chitosan, a biopolymer soluble in dilute (0.1 to 10%) solutions of carboxylic acids, such as acetic acid, is readily regenerated from solution by neutralization with alkali. In this manner, chitosan has been regenerated and reshaped in the form of films, fibers, and hydrogel beads. For instance, chitosan beads are prepared in one conventional method by precipitating dilute solutions of chitosan in acetic acid into alcoholic or aqueous sodium hydroxide followed by solvent exchange with water. However, in contrast to beads from cellulose, which are insoluble in most organic solvents, acids and bases, chitosan retains the solubility in dilute acids of the parent biopolymer. This solubility is typically overcome by inducing crosslinking. A conventional chitosan crosslinking reaction involves dialdehydes, such as glutaraldehyde, or diglycidyl ethers (such as butanediol diglycidyl ether, or epoxides like epichlorohydrin). Chitosan beads crosslinked with diglycidyl ethers are commercially available under the trade name CHITOPEARL, as manufactured by Fuji Spinning, Ltd., Japan.

Also, various researchers have discussed blending chitosan and cellulose to produce biodegradable films (see, for example, U.S. Pat. No. 5,306,550 to Nishiyama et al.; Hosokawa et al., Ind. Eng. Chem. Res., 29:800–805 (1990); Hasegawa et al., J. Appl. Polym. Sci., 45:1873–1879 (1992)). Though cellulose contains only trace amounts of carbonyl groups, these trace amounts of carbonyl groups are suspected in the art to play an important role in crosslinking to chitosan to form a crosslinked polymeric network of cellulose and chitosan.

Also, it has been demonstrated that complexes of chitosan with acetic acid (viz., chitosonium acetate) are converted to chitin (i.e., the N-acetylamide of chitosan) by a heat-catalyzed amidification or dehydration reaction, in U.S. Appln. Ser. No. 08/435,866 to Glasser et al., filed May 5, 1995. The amidification reaction described in U.S. Appln. Ser. No. 08/435,866 converts acid-soluble chitosan into acid-insoluble chitin.

However, because chitosan is easily solubilized and processed, a great deal of research in the hydrogel field has been devoted to experimentation with and/or use of chitosan in a wide variety of applications such as bioseparations. The art would be highly interested in a facile technique to form magnetic-functionalized, crosslinked chitosan support material.

SUMMARY OF THE INVENTION

It is an object of this invention to provide a method for forming magnetic, crosslinked chitosan support materials.

Briefly and in general terms, the invention concerns a method for magnetizing crosslinked chitosan support material involving the treatment of carboxyl group-containing, crosslinked chitosan gels with solutions of ferrous chloride ($FeCl_2$) followed by treatment with dilute aqueous alkali and oxidation with oxygen gas ($O_2$) to produce highly enriched magnetizable chitosan particles, beads, films and/or coatings.

Before magnetic functionalization is imparted according to the invention, the chitosan starting material is crosslinked so that the chitosan can better tolerate alkali and acidic conditions encountered during the magnetization reaction. The chitosan starting material is crosslinked preferably, but not mandatorily, with difunctional, dicarboxylic acids or acid anhydrides thereof, which, in addition to their dual carboxylic functionality possess functionality capable of independent polymerization and thus the formation of an independent polycarboxylic gel.

A beaded chitosan material crosslinked with a suitable difunctional, dicarboxylic acid or acid anhydride thereof, such as itaconic anhydride or maleic anhydride or citraconic anhydride, under appropriate heating conditions, as described herein, forms a carboxylated, crosslinked chitosan gel without disturbing or distorting the preshape of the beads. In this invention, these carboxylic acid gel sites are the target of a sequence of reaction steps leading to micron-sized magnetic particles via a magnetization reaction. The magnetization reaction scheme can be repeated one or more times, if desired.

Bead form magnetic chitosan products of this invention can be oriented, made to cluster and aggregate, and collected and harvested using a magnetic field produced by an internal or external magnet (permanent or electric). The resulting magnetic crosslinked chitosan beads lose their magnetism after removal of the magnetic field (superparamagnetism); and their magnetic properties do not interfere with other activities, such as ion exchange and protein binding. The magnetic crosslinked chitosan beads made by this invention can be oriented and collected from complex mixtures containing other (nonmagnetic) suspended particles.

The magnetic chitosan hydrogel material obtained by this invention has additional functionality capable of interacting with the products of biotechnology and constitute separation materials endowed with great versatility. The magnetic crosslinked chitosan beads made pursuant to the invention are well-suited for use as softgel beads for bioseparations, especially separations of proteins. Also, the magnetic crosslinked chitosan beads of this invention can be used for water purification.

BRIEF DESCRIPTION OF THE DRAWINGS

The foregoing and other objects, aspects, features, and advantages of the present invention will be better understood from the following detailed description of the preferred embodiments of the invention with reference to the drawings, in which.

DETAILED DESCRIPTION OF THE PREFERRED EMBODIMENTS OF THE INVENTION

Figure 1:
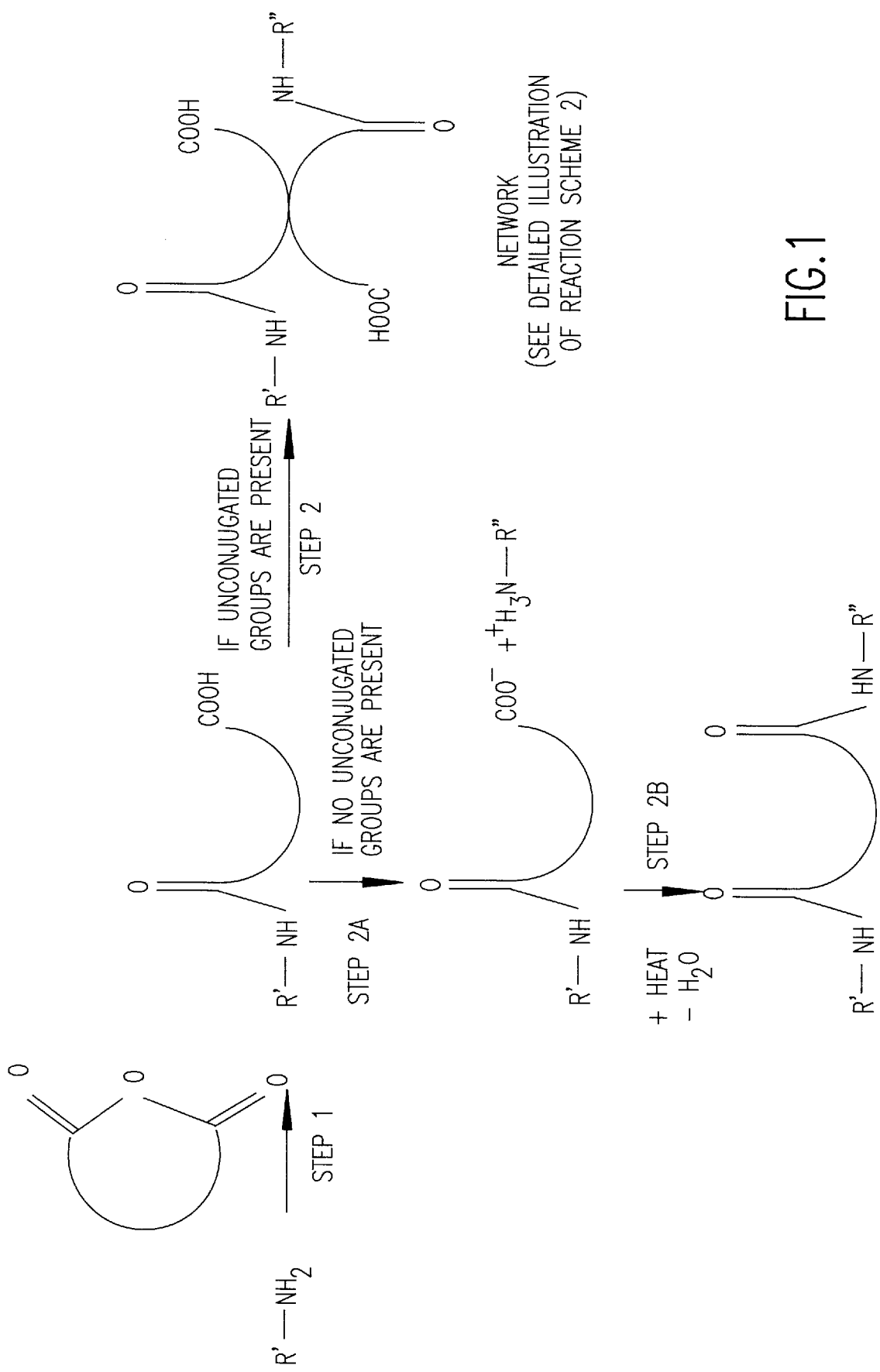
FIG. 1 is a schematic representation of a reaction of chitosan with anhydrides according to Reaction Scheme 1 during a stage of preparation of a starting material of this invention.

The present invention must be practiced with crosslinked chitosan material as a starting material to preserve and maintain the preshape of the chitosan material during the magnetization reaction scheme. Uncrosslinked chitosan, if used, would dissolve when exposed to the dilute solution of aqueous alkali employed to cause in situ precipitation of the ferrous hydroxide during the second step of the magnetization reaction scheme. Therefore, any preshape imparted to the chitosan material as introduced to the magnetization reaction scheme would be sacrificed and lost during such dissolution.

Chitosan thus is first crosslinked with acids capable of forming a carboxylic acid group containing hydrogel inside a polysaccharide gel by a polymerization mechanism which leaves other functionalities largely intact (such as by chain growth polymerization). The crosslinked chitosan is then magnetized, generally speaking, by a stepwise reaction involving: (a) reacting the preshaped gel particles with ferrous chloride, (b) reacting the ionic intermediate complex formed by step (a) with dilute aqueous sodium hydroxide at room temperature (approx. 20°–28° C.) to form (precipitate) ferrous hydroxide (Fe(OH)$_2$) and the corresponding sodium salt of the ionic intermediate complex; and (c) oxidizing the ferrous hydroxide formed by step (b) in the presence of a stoichiometric amount of oxygen gas at 55°–75° C., preferably at 65° C., effective to form a fine dispersion of ferric oxide (Fe$_3$O$_4$) particles. For purposes of this application, ferric oxide (Fe$_3$O$_4$) also can be referred to by its trivial names: ferrite and/or magnetite.

It has been discovered by the present investigators that chitosan material that is crosslinked in a preliminary operation using dicarboxylic acids or acid anhydrides thereof capable of forming an alkali-insoluble (and acid-insoluble) polymeric gel containing a sufficient number of carboxylic acid groups has the capacity for becoming highly enriched with magnetic particles (Fe$_3$O$_4$) by the magnetization reaction and can tolerate the acidic and alkaline reagents without sacrificing the preshape of the chitosan material.

More specific details on the methods for crosslinking and magnetizing the chitosan are provided below. Methods for crosslinking the chitosan are described in U.S. Appln. Ser. No. 08/654,929 (Glasser et al.), filed May 29, 1996. The crosslinking methods are described herein below.

Chitosan, as a starting material of the inventive method, is commercially available from a wide variety of sources including under the trade name VANSON of Redmond, Wash., and PROTAN of Woodinville, Wash. Alternatively, the chitosan starting material can be made by any convenient conventional method, such as by hydrolyzing chitin in a concentrated solution of sodium hydroxide on heating and then recovering chitosan by filtration and water washing. The chitosan starting material is soluble in dilute acids but not soluble in neutral water or alkali. Chitosan is an amorphous solid which is more soluble in water having a pH less than 6, than chitin, but chitosan usually requires the use of aqueous organic acids to attain solubility.

Chitosan is a glucose amine polymer. The chemical structure of chitosan has a repeating structural unit that is represented by Formula (I) as follows:

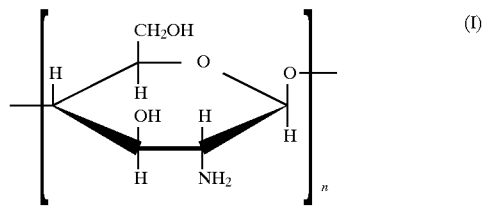

where n is greater than 3.

The chitosan starting material can theoretically be substituted or unsubstituted at the ring hydroxy moiety or the hydroxy methyl moiety. These substituents may represent ethers, esters, carbamates, or other types. The important feature is that the chitosan has a majority of free, primary amine groups along its polymeric backbone to form ionic complexes with the dicarboxylic acids or acid anhydrides thereof. Preferably the chitosan has a weight-average molecular weight (M$_w$) ranging from about 10$^4$ to about 10$^6$; although the molecular weight may be varied depending on the ultimate use envisaged for the crosslinked chitosan product.

The chitosan starting materials can be porous or nonporous, and have a geometrical shape that can be regular or irregular, depending at least in part on the ultimate usage of the support material envisaged.

"For example, the chitosan support material may be in the form of spherical beads, films, and fibers. In the case of a porous chitosan starting material, the amine groups along its polymeric backbone on internal and external surfaces of the starting material should be available for reaction to form ionic complexes on the inside and outside of the starting material."

For the sake of convenience and illustration, the description herein will occasionally refer to the chitosan support material in the context of beads, although it is to be understood that the invention is not necessarily limited to that configuration.

The solid chitosan starting material is dissolved in a weak organic acid, such as 1 to 5 wt. % acetic acid, formic acid, and the like, to provide a chitosan solution. Bead form chitosan hydrogels are formed from the chitosan solution by atomizing the solution of chitosan in aqueous alkali (e.g., 0.1 to 2.0N sodium hydroxide solution). The hydrogel beads formed are decanted, filtered, washed and stored in distilled water for subsequent treatment. The dissolved chitosan starting material, in hydrogel form, is solvent-exchanged with a non-aqueous liquid solvent to displace water from the chitosan support material (e.g., beads) and create anhydrous conditions within the support material (e.g., beads). Suitable non-aqueous solvents for this purpose include alcohols (e.g., isopropyl alcohol), acetone, dioxane, chloroform, benzene, tetra-hydrofuran, toluene, and xylene. This solvent-exchange procedure is performed prior to performing any optional functionalization step and the required crosslinking step of the invention. The presence of water, especially as a medium, is undesired during the amidification reaction as it slows down the reaction and lowers the degree of crosslinking attained. Trace amounts of water left as residue in the solvent-exchanged beads seldom raise this problem. However, if residual traces of water in the solvent-exchanged beads interfere with crosslinking (such as indicated by alkali solubility in the final product), the traces of water can be more rigorously removed and excluded by taking precautions such as employing freshly cut potassium or sodium metal as a dessicant in the non-aqueous solvent being used to replace the water. Also, moisture indicators, such as benzophenone, optionally can be used to assist in determining conditions sufficiently anhydrous for reactions to proceed expediently and efficiently.

Also, the practice of this invention preferably involves usage of "never-dried" hydrogel beads from chitosan through the course of the inventive method(s). The terminology "never-dried", as used herein, means beads which have the bead and pore size of beads which have not been subjected to water removal (dehydration) or organic solvent removal to leave the beads devoid of liquid solvent, whether aqueous or non-aqueous, at any given time before or during processing to permit drying thereof. Drying of the beads is undesired as it causes shrinkage and thus size reduction in the beads, which effect is not completely reversible upon rehydration or upon combination with a polar organic solvent.

In any event, once solvent-exchanged, the chitosan material is combined with a dicarboxylic acid or acid anhydride thereof to form a chitosonium ion complex that is water soluble. Although not part of the present invention, the chitosonium ion complex, prior to being heated, will behave in a manner similar to gum or ionic starch if dissolved in water.

When the chitosan starting material and the dicarboxylic acid or acid anhydride thereof are combined, they interact at the primary amine of the chitosan starting material to produce a chitosonium ion complex. For example, in the case of maleic anhydride being combined with chitosan, chitosonium maleate is formed. The chitosan/dicarboxylic acid complex is water-soluble at a pH above 8.

Once the chitosonium ion complex is formed, heat is applied to induce amidification of chitosonium ion complex to form an intermediate product. The intermediate product is schematically shown as the product of step 1 in Reaction Scheme 1 depicted in FIG. 1. Reaction Scheme 1 is a schematic representation of the reaction of chitosan with anhydrides. Step 1 is fast, and Step 2 requires the presence of polymerizable (i.e., double) bonds that react faster than Step 2b. Step 2a and 2b-reactions are promoted by the size of the anhydride cycle and by water removal.

The source of heat can be applied in any convenient manner to the chitosonium ion complex. The chitosonium ion complex can be heated in a reaction vessel by use of conventional laboratory or industrial heating arrangements for liquid reaction baths, as appropriately selected for the desired scale of the operation. The heating system can be either an open or closed system.

The heating temperature applied to the reaction bath through all stages of the crosslinking reaction (i.e., steps 1 and 2; or steps 1, 2a and 2b) preferably is maintained at a constant value. The reaction temperature and duration of heating to effect crosslinking of the chitosan according to the inventive method will depend in large part upon the non-aqueous solvent (and its boiling point) involved and the degree of crosslinking desired. The reaction temperature generally will range between 40° to 160°° C. depending on the particular non-aqueous solvent. For example, where isopropyl alcohol is the liquid medium exchanged for water in the chitosan hydrogel, the crosslinking reaction temperature preferably is approximately 80° C., and the heating time generally is about 5 to 50 hours, usually about 6 to 24 hours to effect complete crosslinking of chitosan hydrogel beads.

As to the intermediate product of step 1, the application of heat initially converts ammonium organic acid ionic groups of the chitosonium ion complex to N-organic acid groups. Thus, a non-crosslinked monocarboxylic acid derivative is formed as an intermediate product derived during an incipient phase of the heating procedure from the partial amidification of chitosonium ion complex. The proportion of the chitosonium ion complex functionalized in this way upon completion of the first step (step 1) of the heating procedure is variable, although high levels of functionalization are typically targeted and achieved in practice. The intermediate reaction product of step 1 of the inventive method, i.e., the noncrosslinked monocarboxylic derivative, remains insoluble in neutral water and becomes insoluble in acids while being soluble in dilute alkali as attributable to the carboxyl functionality.

For example, where maleic anhydride is used, chitosan maleate is formed upon completion of step 1 as the initial phase of the heating procedure. That is, ammonium maleate groups at primary amines are converted to chitosan N-maleayl groups. The resulting intermediate product is alkali soluble as attributable to the remaining carboxylic functionality of the added maleayl group.

As seen by reference to Reaction Scheme 1, intermolecular polymerization of the intermediate product of step 1 can proceed along two possible pathways depending on whether the dicarboxylic acid reactant or anhydride thereof has a polymerizable double bond(s). Advancement by Step 2 requires the presence of polymerizable double bonds in the dicarboxylic acid or anhydride thereof which will react faster than step 2b. The heating condition is maintained such that the polymerizable double bonds react with polymerizable double bonds on a neighboring intermediate product. The product of step 2 is an inter-molecular network formed from different monocarboxylic acid derivatives.

However, when dicarboxylic acids or anhydrides thereof lacking polymerizable double bonds are involved, then the reaction will advance through steps 2a and 2b to completion.

To effectuate and complete the desired crosslinking reaction according to the pathway of steps 2a and 2b, the free carboxylic acid group of the non-crosslinked monocarboxylic acid derivative, i.e., the intermediate formed at step 1, is reacted with the $NH_2$ group of an adjacent chitosan molecule after first driving off a molecule of water. The reactions of Steps 2a and 2b are promoted by the size of the anhydride cycle and by the removal of water.

Therefore, as heating is continued in steps 2a and 2b, crosslinking is heat-induced between the monocarboxylic acid derivative intermediate product that has completed step 1 with nonfunctionalized chitosonium ion complex that is present. As with the intermediate formed by step 1 during initial phases of heating, the heating condition is also used to convert the anhydride to a monocarboxylic acid by amidification. However, the reaction that occurs in this later phase of heating of step 2b converts, inter-molecularly, the ammonium groups of a chitosonium ion complex (non-functionalized during initial heating) to N-acyl groups by reaction with the remaining free carboxyl functionality on a monocarboxylic acid derivative intermediate product. The dicarboxylic acid or acid anhydride thereof, is thus progressively and ultimately reacted with both carboxylic acid functionalities with two equivalents of amines, culminating in inter-molecular crosslinking as a second reaction stage reached in a later phase of the heating step. In this way, a fully crosslinked, non-carboxylic diamide is formed via steps 2a and 2b.

The resulting amidified, crosslinked chitosan complex of either step 2 or step 2b is swellable in aqueous or non-aqueous solvents, and it is insoluble in acids, bases or neutral water. Catalysts are not required for the first or second stages of the amidification reaction, although it is contemplated that certain catalysts could be used to promote either stage of this step, such as Lewis acids like $Al_2O_3$.

Since the noncrosslinked intermediate of step 1 is insoluble in dilute acid or neutral water but soluble in alkali, while the final product of the heating step, i.e., the crosslinked dicarboxylic derivative of step 2 or 2b, is insoluble in all solvents whether acids, neutral in pH, or bases, the progress and extent of the crosslinking (heat-induced amidification) reaction of the present invention can be easily monitored and assessed by routine solubility tests.

Figure 2:
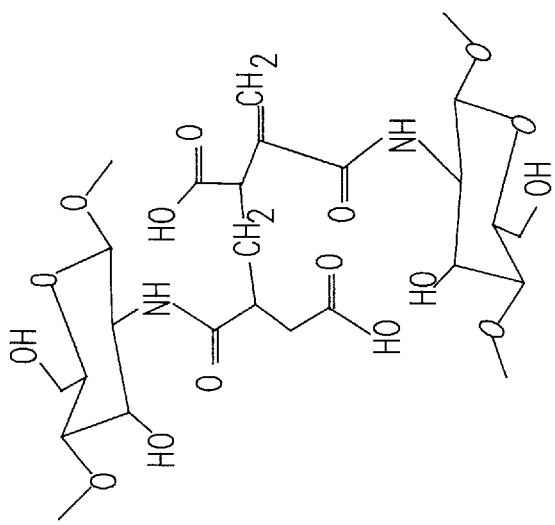
FIG. 2 is a schematic representation of a reaction to prepare a crosslinked chitosan hydrogel according to Reaction Scheme 2 during a stage of preparation of a starting material of this invention.
Figure 2:
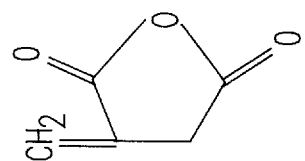
Figure 2:
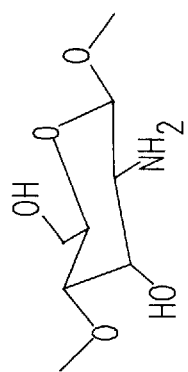

It is to be borne in mind that the particular dicarboxylic acid anhydride depicted in Reaction Scheme 1, is merely representative. The dicarboxylic acids and acid anhydrides thereof described herein can be used and will inter-act with the chitosan material, and the ionic complex and intermediate derivatives thereof, consistent with general scheme shown in Reaction Scheme 1. For instance, Reaction Scheme 2 depicted in FIG. 2 illustrates a carboxylated, crosslinked chitosan gel made using itaconic acid, a difunctional dicarboxylic acid, for crosslinking where the crosslinked chitosan hydrogel has free carboxylic acid groups.

Crosslinked chitosan bead products made as described herein, generally have a solids content, by weight, ranging from about 1.0% to about 10.0%, with the remainder being constituted by solvent. As saturated with water, it is preferred that crosslinked beads with the magnetization functionalization described herein, contain 1 to 3 wt. % solids and have an average particle diameter size greater than about 0.3 mm, more preferably ranging from about 0.5 mm to about 2.0 mm. Also, after crosslinking the chitosan material, as described herein, the crosslinked chitosan hydrogel can be exchanged back into aqueous medium (i.e., water), and the non-aqueous solvent recovered.

The dicarboxylic acids useful in the invention are organic compounds having two carboxyl groups. The carboxyl groups are pendant groups and can independently be terminal groups or side groups on the main chain. The related acid anhydrides of the dicarboxylic acids that can be used are five-or six membered ring structures including a fused ring portion formed of the two carboxyl groups. The pair of carboxyl groups in the dicarboxylic acids or acid anhydrides thereof can represent the only substituents (non-inclusive of hydrogen atoms) attached to the main chain. Alternatively, the dicarboxylic acid or acid anhydride thereof can possess other substituents in addition to the pair of carboxyl groups as long as the additional substituents do not interfere with, or otherwise hinder, the amidification reaction. The dicarboxylic acid main chains can be saturated or unsaturated at the various carbon-to-carbon bonds forming the main chain or backbone. The main chain preferably comprises 1–30 carbon atoms. Straight chains are usually preferable over branched chains due to steric effects. The carbon-to-carbon bonds forming the ring structure of the acid anhydrides can be saturated or unsaturated.

Preferred dicarboxylic acids and acid anhydrides thereof for use in the invention include those possessing polymerizable double bonds, more preferably conjugated double bonds. While not desiring to be bound to any particular theory at this time, it is postulated that double bonds present in the backbone or main chain of the dicarboxylic acid or anhydride thereof become polymerization sites when the $NH_2$ groups are exhausted. The polymerization of the double bonds between different chitosan molecules forms a network structure which serves to increase opportunities for unreacted amines to interact with free carboxyl groups in the system, thereby enhancing the advancement of crosslinking.

Double bonds that alternate with single bonds are said to be conjugated. As known, a conjugated system is characterized by a delocalized n-bond spread over the bond lengths of several linked carbon atoms due to them all contributing p-orbitals to the r-bond system, so that electron-rich atoms result at each carbon atom in the conjugated chain as a mesomeric effect. Useful conjugated systems include dicarboxylic acids or acid anhydrides thereof having isolated double bonds, cumulated double bonds, and $\alpha,\beta$-unsaturated carbonyl compounds.

In an $\alpha,\beta$-unsaturated carbonyl compound, the carbon-carbon double bond and the carbon-oxygen double bond are separated by only one carbon-carbon single bond. Examples of $\alpha,\beta$-unsaturated carbonyl compounds useful in the practice of this invention include, for example, maleic acid (cis-HOOCCH=CHCOOH), fumaric acid (trans-HOOCCH=CHCOOH), itaconic acid ("methylene succinic acid" $CH_2$=C(COOH)$CH_2$COOH), citraconic acid ($CH_3$C(COOH)=CHCOOH), maleic anhydride, itaconic anhydride, and citraconic anhydride.

The dicarboxylic acid compounds can be made by conventional methods, such as by hydrolysis of a dinitrile or a cyanocarboxylic acid, or oxidation of dimethylbenzene to yield a phthalic acid. The acid anhydrides can be formed by simple heating of the corresponding dicarboxylic acid to produce a ring structure, such as in case of maleic anhydride, succinic anhydride, and phthalic anhydride. For instance, when maleic acid is heated at 100° C., or when fumaric acid is heated at 250°–300° C., both acids yield the same anhydride, viz., maleic anhydride (cis-butenedioic anhydride).

Dicarboxylic acids and anhydrides thereof lacking carbon-carbon double bonds also can be used as they will react as long as COOH and $NH_2$ groups are present in equimolar amounts. For instance, other useful dicarboxylic acids and anhydrides thereof include oxalic acid (HOOC—COOH); malonic acid (HOOCCH$_2$COOH), succinic acid (HOOC(CH$_2$)$_2$COOH), glutaric acid (HOOC(CH$_2$)$_3$COOH), adipic acid (HOOC(CH$_2$)$_4$COOH), phthalic acid (1,2-C$_6$H$_4$(COOH)$_2$), isophthalic acid (1,3-C$_6$H$_4$(COOH)$_2$), terephthalic acid (1,4-C$_6$H$_4$(COOH)$_2$), succinic anhydride, phthalic anhydride. Other dicarboxylic acids that can be used include substituted dicarboxylic acids, such as malic acid (HOOC—CH(OH)CH$_2$—COOH) or aldaric acids (HOOC—(CHOH)$_n$—COOH where n=1 or more) such as tartaric, glucaric, mannaric, xylaric acids, and the like; and dimethoxy carboxylates such as dimethoxy succinic acid (HOOC—CH(OCH$_3$)C(OCH$_3$)—HCH(OCH$_3$)—COOH) which also will undergo removal of methanol during amidification. The dicarboxylic acid also can be a polycarboxylic acid such as pectin, xylan, carboxy methyl cellulose, and the like.

The chitosan gel beads crosslinked with dicarboxylic acids capable of simultaneously forming a continuous carboxylic acid gel structure embedded inside the continuous chitosan gel are not soluble in any of neutral, acidic, or alkaline solutions. These crosslinked chitosan beads contain free carboxylic acid, by virtue of partly amidified, non-crosslinked intermediate products, as well as unreacted amine functionalities on the glucose amine polymer material itself.

In addition to the techniques for crosslinking chitosan used in this invention prior to conducting the magnetization of the beads, the chitosan beads optionally can be subjected to activation reactions which result in altered functionality and altered solubility in addition to the magnetization. For instance, the chitosan beads in solid form, in non-aqueous suspension, can be reacted with a quaternizing reagent, such as a glycidyl quaternary salt, to form a quaternized functional chitosan hydrogel. An example of a suitable quaternizing compound in this regard is glycidyl trimethyl ammonium chloride.

Chitosan beads so derivatized, i.e., quaternized, reveal significant solubility in both aqueous dilute acids and neutral water (pH=7). This functionalization by quaternization is highly beneficial for the sorption properties of chitosan beads and can be used for separations in biotechnology (e.g., protein separations). Quaternized chitosan tends to be soluble in aqueous environments. However, solubility in water and dilute acids is overcome in the present invention when the functionalized beads are subsequently subjected to amidification and crosslinking with dicarboxylic acids or acid anhydrides thereof according to the present invention. Quaternized chitosan beads crosslinked with either itaconic or maleic anhydride according to the invention, for instance, have been observed to be both (a) insoluble in acid, water, or alkali; and (b) quaternized so as to possess highly adsorbent functional groups for protein adsorption.

The quaternized chitosan beads in non-aqueous suspension can be further functionalized with α-, β-, or γ-cyclodextrin. The cyclodextrin functionalized chitosan beads are highly beneficial for chiral separations. They are insoluble in aqueous medium over a wide pH-range. The crosslinked-cyclodextrin functionalized chitosan beads obtained according to the amidification crosslinking reaction with itaconic, citraconic or maleic acid or anhydrides thereof are insoluble in acid, water, or alkali, and they possess the functional groups needed for chiral separations.

The quaternary functionalization reaction and the secondary cyclodextrin-modification reaction for the chitosan can employ reaction conditions (temperature and time) similar to those described above for performing the crosslinking reactions for a common type of chitosan salt and solvent. Methods for the optional functionalizations of the chitosan are described in greater detail in U.S. Appln. Ser. No. 08/654,929 (Glasser et al.), filed May 29, 1996, which teachings are incorporated herein by reference.

The method of using heat-induced amidification chemistries involving dicarboxylic acid or related acid anhydride reagents enables the production of crosslinked, highly expanded chitosan beads, optionally functionalized in any one of several functionalities in addition to magnetization, which is described in greater detail below, in solid form without distortion or loss of the original bead shape.

Figure 3:
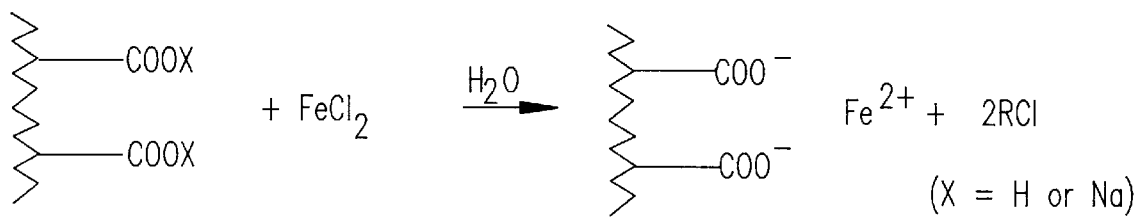
FIG. 3 is a schematic representation of a reaction to prepare a magnetized, crosslinked chitosan hydrogel according to Reaction Scheme 3 of this invention.
Figure 3:
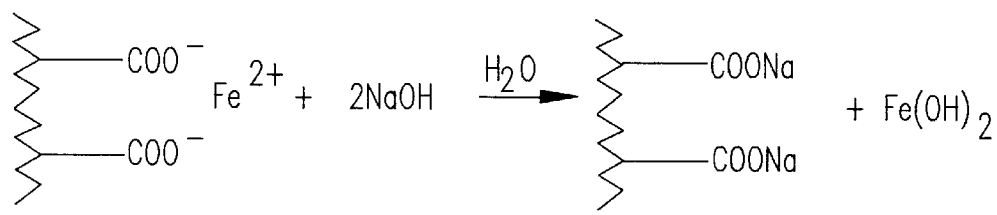
Figure 3:
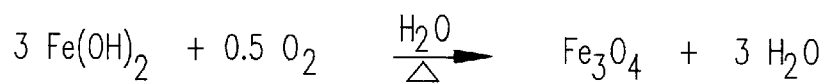

The crosslinked, optionally functionalized, gel structure is then subjected to a magnetization reaction scheme of the present invention involving sequential steps using reagents of ferrous chloride, aqueous alkali, and oxygen. The magnetization reaction scheme according to this invention is illustrated in Reaction Scheme 3 depicted in FIG. 3.

This method, as illustrated in Reaction Scheme 3, for forming magnetizable, crosslinked chitosan support material includes a first step (i.e., Step A) of reacting the crosslinked chitosan support material with aqueous ferrous chloride at about 20°–28° C., preferably 25° C., for about 10 minutes effective to form a Fe (II) chitosonium ion complex. Then, the Fe (II) chitosonium ion complex formed by Step A is reacted in a second step (i.e., Step B) with dilute aqueous sodium hydroxide at about 20°–28° C., e.g., 25° C., for about 5 minutes to form ferrous hydroxide and a corresponding sodium salt of the chitosonium ion complex. In a third step (i.e., Step C), the ferrous hydroxide formed by step B is oxidized in the presence of a stoichiometric amount of oxygen gas with stirring at about 55°–75° C., preferably 65° C., for about two hours effective to form a dispersion of ferric oxide particles in the crosslinked chitosan support material. Size is controlled by functionality.

The magnetization reaction scheme can be repeated one or more times, if desired, to increase the degree of enrichment with ferric oxide.

An important outcome of the magnetization reaction involving the crosslinked chitosan is that Fe (II)-sites are evenly distributed throughout the bead, resulting in an even distribution of Fe$_3$O$_4$-particles throughout the bead structure. The treatment with aqueous sodium hydroxide at ambient temperatures and with oxygen gas at elevated temperatures produces a fine dispersion (inclusion) of Fe$_3$O$_4$-particles in a size range of nano- to micrometers (ie, 0.005 to 5 hrs.) as has been confirmed by the present investigators by SEM (Scanning Electron Microscope) and EDAX Spectral analysis. Micron size iron oxide particles produce super-paramagnetism that is required for re-usable magnetic gel particles which display magnetic properties only in the presence of a magnetic field. This means that they fail to cluster on account of their remanent magnetic properties when not exposed to a magnetic field.

The resulting superparamagnetic chitosan hydrogel beads are insoluble in acid, alkali, and neutral solutions; and they remain virtually unaltered by the magnetization reaction other than in color. The magnetized, crosslinked beaded chitosan product of the invention assume a light brown textured hue. The amine functionalities of the chitosan backbone substantially remain intact.

The magnetic beads respond to the application of a magnetic field by being attracted; by becoming oriented in relation to the magnetic field; by migrating in the direction of the magnetic pole; and by becoming collectable and harvestable in complex solutions and suspensions of non-magnetic particles.

The invention thus provides a technique for magnetizing chitosan hydrogel beads that have been previously crosslinked with difunctional, dicarboxylic acids or acid anhydrides thereof, those acids and acid anhydrides thereof being capable of supporting an independent polymerization mechanism and producing a highly carboxylated hydrogel inside, and attached to, the chitosan hydrogel, by a stepwise and sequential treatment with ferrous chloride, alkali, and oxygen. The resulting magnetic beads have particulate ferrite ($Fe_3O_4$) inclusions in a size producing highly desirable magnetic properties without remanence.

The magnetic, crosslinked hydrogel beads made by this invention possess additional functionality capable of interacting with the products of biotechnology as separation materials with great versatility. For example, the beads can be used in separations of proteins. The beads also can be used in waste water purification systems as a filter material. The magnetized, crosslinked beaded chitosan product of the invention can be oriented and collected from complex mixtures containing other (nonmagnetic) suspended particles.

The magnetized, crosslinked chitosan materials formed by the inventive methods can be effectively used as chromatographic supports such as in biotechnology applications, as well as in waste water treatment.

This invention will now be understood more readily with reference to the following examples. However, these examples are intended merely to illustrate the invention and are not to be construed as limiting the scope of the invention. In the examples, all weights, percentages, and amounts therein are by weight unless indicated otherwise.

EXAMPLES

Preparation of Chitosan Starting Material

For purposes of the following examples, chitosan starting material was prepared as follows. Chitosan flakes were dissolved in 1 to 5 wt. % acetic acid to provide a chitosan concentration between 0.5 to 3 wt. % by stirring at room temperature. The dissolved chitosan was centrifuged to remove extraneous matter. The solution of chitosan was atomized into a 0.1 to 2N aqueous sodium hydroxide solution to form chitosan hydrogels in bead form. The chitosan beads were removed from the sodium hydroxide solution by decantation and filtration. The beads were washed with distilled water in a glass column by standing in water for 30 minutes and then replacing with fresh distilled water several times to obtain chitosan beads at a neutral pH. The beads were kept in water and stored in a closed container. The solids contents of the beads were between 1 and 5 wt. % as determined by lyophilization and thermogravimetric analysis (TGA).

Example 1

An aqueous suspension of chitosan beads prepared from the Preparation Procedure for Chitosan Starting Material was transferred to a sintered glass Büchner funnel and excess water was removed by suction. 100 g of the moist chitosan beads (solids content 2.0 wt. %) were immersed in 200 mL isopropyl alcohol and allowed to exchange with water inside the beads by stirring for 30 minutes. The isopropyl alcohol was filtered away and then replaced with a fresh batch of 200 mL of isopropyl alcohol. The mixture was stirred for 30 minutes. The solvent exchange process was repeated 3 times to exchange almost all water from the beads to isopropyl alcohol.

The isopropyl alcohol-exchanged chitosan beads (never-dried) were suspended in 200 mL isopropyl alcohol and 4.0 g itaconic anhydride was added to the bead suspension. The reaction mixture was refluxed for 16 hours at a temperature of 82° C., and then cooled to room temperature. The crosslinked chitosan beads obtained were washed twice with 200 mL portions of isopropyl alcohol and then three times with 250 mL portions of distilled water by stirring for 30 minutes each. The crosslinked chitosan beads were stored in water. The solids content of the chitosan itaconate beads was 5.9 wt. % as determined by TGA. The crosslinked itaconate beads produced were insoluble in dilute acetic acid, neutral pH water, and dilute sodium hydroxide solution.

The crosslinked chitosan was then magnetized according to the following procedure.

12.0 g of the moist crosslinked beads were reacted with 20 mL aqueous ferrous chloride (0.028 g/mL) at about 25° C. for 10 minutes. The Fe (II) chitosonium ion complex product was reacted with 40 mL 0.112N aqueous sodium hydroxide at 25° C. for five minutes to form ferrous hydroxide precipitate and a corresponding sodium salt of the chitosonium ion complex. The temperature of the reaction mixture was raised to 65° C. under a nitrogen atmosphere and stirred for 30 minutes. In a final step, the ferrous hydroxide formed by the previous step was oxidized in the presence of a stoichiometric amount of oxygen gas under a nitrogen atmosphere with stirring at 65° C. for two hours effective to form a uniform distribution of ferric oxide particles in the matrix of the crosslinked chitosan support material.

The magnetized crosslinked chitosan itaconate beads were washed several times with distilled water by stirring for 30 minutes each. The yield of moist magnetized chitosan beads was 13.6 g. The ferric oxide content of the magnetized chitosan itaconate beads was 11.3 wt. % of dried beads as determined by TGA. The whole procedure of the magnetization of crosslinked chitosan beads was considered one cycle.

2.0 g of magnetized crosslinked chitosan beads (cycle 1) was stored in water and the remaining of the magnetized beads from cycle 1 (11.6 g) was further magnetized with the same procedure for cycle 1 magnetization to increase the degree of enrichment. The yield of cycle 2 magnetized chitosan itaconate beads was 10.2 g. The ferric oxide content of the magnetized chitosan itaconate beads (cycle 2) was 12.5 wt. % of dried beads as determined by TGA.

2.0 g magnetized crosslinked chitosan beads (cycle 2) was stored in water and the remaining of the magnetized beads from cycle 2 (8.2 g) was further magnetized with the same procedure for cycle 1 magnetization to further increase the degree of enrichment. The yield of cycle 3 magnetized chitosan itaconate beads was 8.0 g. The ferric oxide content of the magnetized beads (cycle 3) was 17.5 wt. % of dried beads as determined by TGA.

2.0 g magnetized crosslinked chitosan beads (cycle 3) was stored in water and the remainder of the magnetized beads from cycle 3 (6.0 g) was further magnetized with the same procedure for cycle 1 magnetization to further increase the degree of enrichment. The yield of this cycle 4 magnetized chitosan itaconate beads was 5.6 g. The ferric oxide content of the magnetized beads (cycle 4) was 24.3 wt. % of dried beads as determined by TGA.

2.0 g magnetized crosslinked chitosan beads (cycle 4) was stored in water and the rest of the magnetized beads from cycle 4 (3.6 g) was further magnetized with the same procedure for cycle 1 magnetization to further increase the degree of enrichment. The yield of cycle 5 magnetized chitosan itaconate beads was 3.3 g. The ferric oxide content of the magnetized beads (cycle 5) was 25.9 wt. % of dried beads as determined by TGA.

The magnetized, crosslinked chitosan beads formed were then examined by SEM and EDAX (Energy dispersive X-ray) Spectral analysis which verified the inclusion of ferric oxide in the micron size range on the surfaces and within the crosslinked chitosan beads. The spike observed in the data taken by the EDAX Spectral analysis corresponded identically to the location of the signal taken for an iron control, which confirmed the magnetized state of the beads.

Example 2

The same procedure for crosslinking of chitosan beads as in example 1 was used except that maleic anhydride was used instead of itaconic anhydride. The crosslinking reaction time was again 16 hours. The crosslinked chitosan maleate beads had a solids content of 4.7 wt. % according to TGA. The crosslinked chitosan maleate beads produced were insoluble in dilute acetic acid, neutral pH water, and dilute sodium hydroxide solution.

The crosslinked chitosan maleate beads were magnetized for five cycles in the same manner as Example 1. The cycle 1, 2, 3, 4 and 5 magnetized crosslinked chitosan maleate beads had a ferric oxide content 2.2, 2.8, 4.9, 6.5, and 8.0 wt. % of the dried beads, respectively.

Example 3

The same procedure for crosslinking of chitosan beads as in example 1 was used except that citraconic anhydride was used instead of itaconic anhydride. The reaction time was again 16 hours. The crosslinked chitosan citraconate beads had a solids content of 3.8 wt. % according to TGA. The crosslinked chitosan citraconate beads produced were insoluble in dilute acetic acid, neutral pH water, and dilute sodium hydroxide solution.

The crosslinked chitosan citraconate beads were magnetized for five cycles in the same manner as Example 1. The cycle 1, 2, 3, 4 and 5 magnetized crosslinked chitosan citraconate beads had a ferric oxide content 2.2, 2.8, 4.9, 6.5 and 8.0 wt. % of the dried beads, respectively.

Example 4

The same procedure for crosslinking of chitosan beads as in Example 1 was used except that citraconic acid was used instead of itaconic anhydride. The crosslinking reaction time was again 16 hours. The crosslinked chitosan citraconate beads had a solids content of 2.4 wt. % according to TGA. The crosslinked chitosan citraconate beads produced were insoluble in dilute acetic acid, neutral pH water, and dilute sodium hydroxide solution.

The crosslinked chitosan citraconate beads were magnetized for five cycles in the same manner as Example 1. The cycle 1, 2, 3, 4 and 5 magnetized crosslinked chitosan citraconate beads had a solids content of 3.4, 6.7, 6.7, 9.6 and 10.1 wt. % of the dried beads, respectively.

While the invention has been described in terms of its preferred embodiments, those skilled in the art will recognize that the invention can be practiced with modification within the spirit and scope of the appended claims.

What is claimed is:

1. A method for forming magnetic, crosslinked chitosan support material, comprising the steps, in this sequence, of:
    (a) reacting crosslinked chitosan support material with aqueous ferrous chloride effective to form a Fe (II) chitosonium ion complex;
    (b) reacting said Fe (II) chitosonium ion complex formed by step (a) with aqueous sodium hydroxide effective to form ferrous hydroxide and a corresponding sodium salt of said chitosonium ion complex; and
    (c) oxidizing said ferrous hydroxide formed by step (b) in the presence of a stoichiometric amount of oxygen gas effective to form a dispersion of ferric oxide particles in said crosslinked chitosan support material.

2. A method for forming magnetic, crosslinked chitosan support material, comprising the steps, in this sequence, of:
    (a) reacting crosslinked chitosan support material with aqueous ferrous chloride effective to form a Fe (II) chitosonium ion complex;
    (b) reacting said Fe (II) chitosonium ion complex formed by step (a) with dilute aqueous sodium hydroxide to form ferrous hydroxide and a corresponding sodium salt of said chitosonium ion complex; and
    (c) oxidizing said ferrous hydroxide formed by step (b) in the presence of a stoichiometric amount of oxygen gas at about 55° to 75° C. effective to form a dispersion of ferric oxide particles in said crosslinked chitosan support material.

3. The method of claim 2 further comprising repeating steps (a)–(c) at least once.

4. The method of claim 2 where said ferric oxide particles have a particle size ranging from 0.005 to 5 $\mu$m.

5. A method for forming magnetic, crosslinked chitosan from chitosan support material containing water, comprising the steps, in this sequence, of:
    (a) replacing said water from said chitosan support material with a non-aqueous organic fluid;
    (b) combining said chitosan support material with a sufficient amount of dicarboxylic acid or acid anhydride thereof to form a chitosonium ion complex; and
    (c) heating said chitosonium ion complex effective to drive off water via amidification reaction and crosslink said chitosan support material;
    (d) reacting crosslinked chitosan support material with aqueous ferrous chloride effective to form a Fe (II) chitosonium ion complex;
    (e) reacting said Fe (II) chitosonium ion complex formed by step (d) with dilute aqueous sodium hydroxide effective to form ferrous hydroxide and a corresponding sodium salt of said chitosonium ion complex; and
    (f) oxidizing said ferrous hydroxide formed by step (e) in the presence of a stoichiometric amount of oxygen gas effective to form a dispersion of ferric oxide particles in said crosslinked chitosan support material.

6. The method of claim 5, wherein step (c) comprises a first substep and a second substep, wherein said first substep comprises heating said chitosonium ion complex effective to form an intermediate product comprising a non crosslinked, monocarboxylic acid derivative of said chitosonium ion complex, and said second substep comprises heating said intermediate product effective to form a crosslinked chitosan complex.

7. The method of claim 5, wherein said chitosan support material has a shape selected from the group consisting of beads, films, and fibers.

8. The method of claim 5, wherein said chitosan support material comprises beads.

9. The method of claim 5, wherein said chitosan support material comprises spherical beads.

10. The method of claim 5, wherein said chitosan support material comprises chitosan polymers having amine sites, and said chitosan support material comprises a porous network structure having both an exterior surface and an internal surface, and wherein said amine sites on said chitosan polymers in said chitosan support material are reacted during said heating step at locations both on said internal surface and on said exterior surface.

11. The method of claim 5, wherein said non-aqueous organic fluid is selected from the group consisting of isopropyl alcohol, acetone, chloroform, tetrahydrofuran, dioxane, benzene, toluene, and xylene.

12. The method of claim 5, wherein said dicarboxylic acid or acid anhydride thereof is a compound selected from the group consisting of malonic acid, succinic acid, glutaric acid, adipic acid, maleic acid, fumaric acid, itaconic acid, citraconic acid, phthalic acid, isophthalic acid, terephthalic acid, maleic anhydride, itaconic anhydride, succinic anhydride, citraconic anhydride, and phthalic anhydride.

13. The method of claim 5, wherein said dicarboxylic acid or acid anhydride thereof is a compound selected from the group consisting of maleic acid, fumaric acid, itaconic acid, citraconic acid, maleic anhydride, itaconic anhydride, and citraconic anhydride.

14. The magnetic, crosslinked chitosan support material product of the method of claim 1.

15. The magnetic, crosslinked chitosan support material product of the method of claim 2.

16. The magnetic, crosslinked chitosan support material product of the method of claim 5.

17. The magnetic, crosslinked chitosan beaded product of the method of claim 8.

* * * * *